Patented Nov. 11, 1924.

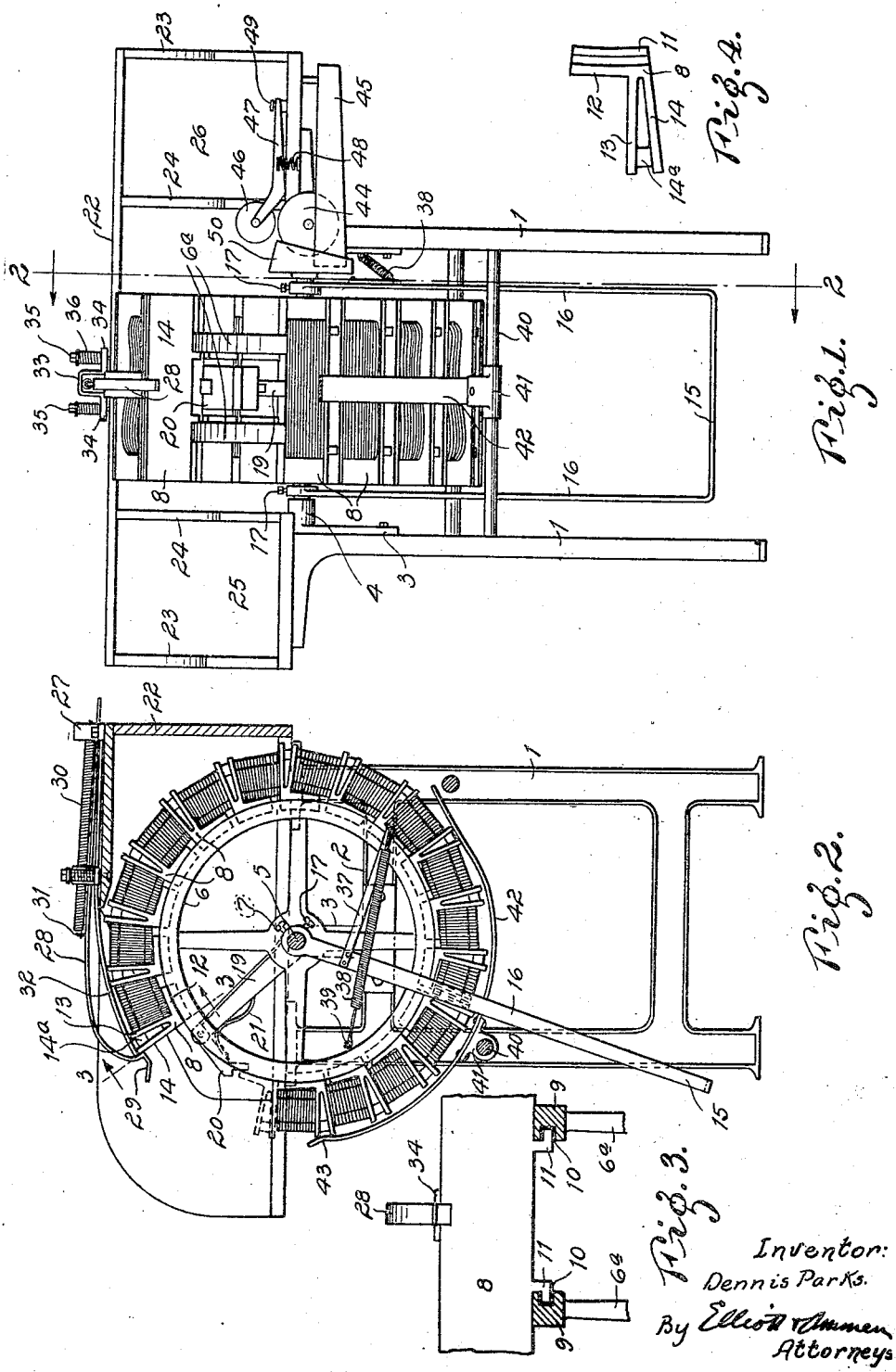

1,514,719

UNITED STATES PATENT OFFICE.

DENNIS PARKS, OF ST. LOUIS, MISSOURI.

MACHINE FOR USE IN MAKING LAMINATED PRODUCTS.

Application filed January 13, 1922. Serial No. 529,072.

*To all whom it may concern:*

Be it known that I, DENNIS PARKS, a citizen of the United States, residing in the city of St. Louis and State of Missouri, have invented new and useful Improvements in Machines for Use in Making Laminated Products, of which the following is a specification.

This invention relates to a novel machine for use particularly in the art of manufacturing shoes and is designed to enable laminated products to be made in large quantities in a simple and efficient manner and with great rapidity. While the machine may be used in the quantitative production of various products comprising two or more flat pieces pasted together by cement, it is more especially designed for making laminated soles, either inner or outer soles, and the drawing illustrates a machine especially intended for such purpose.

The general object of the invention is to provide a manually operated machine embodying a circular carrier and a series of clamping supports slidably mounted about its periphery, each support being adapted to contain a quantity of pasted layers, each of which, in the preferred adaptation of the machine, constitutes a laminated sole, the total quantity of such layers on one support being placed under compression by the pressure on the top of the pile of a succeeding support, acting now as a clamp, and designed in turn to receive an equal quantity of laminated soles positioned thereon by the operator, with means, preferably operated by the foot of the operator, for moving the carrier and the entire series of clamping supports, with the interposed soles, a given distance. Thus, when the series of soles on one support has made the prescribed circuit of the machine, the series of soles inserted in the first support will have had their layers thoroughly pressed together and the paste between the layers will have had time to sufficiently dry, or set. The soles on this support may now be removed and a fresh series of soles built up thereon, this occurring with each clamping support in succession.

Other objects of the invention relate to details of construction entering into the general operation of the machine, which will be more clearly understood from the description to follow.

The present machine is, to a large extent, an improvement over the machine illustrated in the patent to Mitchell & Parks, No. 1,223,894, dated April 24th, 1917. It differs from the machine of the patent referred to in that the clamping members are slidably mounted and independently movable, the movement of the clamping members being directly toward the operator, and the soles are built up directly upon the clamping members initially, requiring a minimum of movement on the part of the operator; the carrier for the clamping members is manually operated; the clamping members act both as supports for a given quantity of the laminated soles, and as clamps or pressure devices for exerting the required degree of pressure upon a previously formed stack of soles on a corresponding clamping member. The machine, therefore, is of very simple construction, requires no previous skill to operate it, and with the exception of a rotary pasting device, embodies no power-driven features in its construction or operation.

The invention, in its preferred embodiment, is illustrated in the accompanying drawing in which—

Figure 1 is a view in front elevation;

Figure 2 is a vertical sectional view on the line 2—2 of Figure 1;

Figure 3 is a broken transverse sectional view on the line 3—3 of Figure 2 taken through the circular carrier to illustrate the manner of slidably mounting the clamping supports therein; and Figure 4 is a side view of one of the clamping supports.

Referring now to the drawing, the numerals 1 indicate standards which are suitably connected, as usual, to form a frame, four of such standards being provided and being arranged two on a side. Mounted on cross-bars 2 connecting opposite standards near the upper part thereof, are two oppositely disposed bracket members 3 which provide at their upper ends, bearings 4 for a cross-shaft 5 on which is fixedly secured a circular carrier 6. This circular carrier is in the form of two wheels 6ª disposed in parallel relation and having a common hub by means of which it is secured on the shaft as by means of a set screw 7. The numerals 8 indicate a series of clamping supports which are slidably mounted on the circular carrier 6, and to this end the manner of mounting illustrated in Figure 3, is preferred. That is to say, the wheels 6ᵃ are each provided with a peripheral flange 9, which is provided on its inner side with corresponding grooves 10. Each of the clamping members 8 is provided on its under side with two oppositely disposed tongues 11 which are slidably mounted in the grooves 10. The tongues 11 fit loosely in the grooves 10 so as to permit the clamping carriers to move in a circular path without undue friction.

The clamping members 8 are of a similar construction and as shown by Figure 4, each of these members comprises a back plate 12, a bed plate 13, and a bottom or pressure plate 14, plates 13 and 14 being connected by ribs 14ᵃ. These plates, as shown, diverge from each other in a direction away from the back plate 12 so that when one of the empty clamping supports is in position to rest upon a pile of soles supported on the clamping member beneath it, and to have a fresh stack of soles built up thereon, the bed plate 13 will occupy a substantially horizontal plane and the angle of inclination of the top surface of the pile of soles mounted thereon will be such that the bottom plate 14 of the succeeding clamping support will rest flush upon the top surface of said pile of soles. It will be obvious that the plates 13 and 14 could be formed as a solid casting having two oppositely inclined faces, but for the purpose of lightness of construction, I prefer to form them as described. It will be understood, of course, that each clamping support is a unitary casting. The circular carrier 6 is designed to be rotated through the medium of a foot lever 15 which, as shown by Figure 1, comprises a bottom cross-bar and side bars 16 formed integral therewith and secured at their upper ends to the shaft 5 on opposite sides of the carrier 6 as by means of set screws 17. Secured on the shaft 5 as by means of a set screw 18, is a lever 19 which projects outwardly to the periphery of the carrier 6 and which has pivotally mounted at its outer end a dog 20 which projects beyond the periphery of the carrier 6 and is adapted to be pressed inwardly against the resistance of a spring 21. The dog 20 is adapted to be moved by the operator pressing inwardly the treadle 15 whereby the dog will engage the upper edge of the back plate 12 and force the carrier 6 to rotate a given distance by means of the frictional engagement of the clamping supports with said carrier. This will more clearly appear from the description of the operation to be given later on. In operation each clamping support with the soles thereon is moved in succession to a predetermined point by the movement of the circular carrier, and to arrest the movement at such point the following construction is provided:

The numeral 22 indicates a bin which is supported on the top of the main frame 1, and has its front side open. This bin is provided with end walls 23 and intermediate partitions 24 to form two receptacles 25, 26 located on opposite sides of the circular carrier 6. Mounted on top of the bin 22 at the rear thereof, is a hollow casting 27 through which projects one end of a leaf spring 28, the other or forward end of which is provided with a hook 29. Secured to the casting 27 is one end of a coil spring 30, the other end of which is secured at 31 to the leaf spring 28. Located underneath the leaf spring 28 is a second leaf friction bar 32, the rear end portion of which extends through a yoke 33 which is provided with foot pieces 34 through which pass loosely screws 35 engaging in screwthreaded apertures in the top of the bin 22. Coil springs 36 are interposed between the heads of the screws and the foot pieces 34. The rear portion of the friction bar 32 passes under the foot pieces 34 so that by turning down the screws 35, the said foot pieces will be caused to bear with greater or less tension upon the friction bar 32. The outer end of this friction bar is curved so that when the clamping supports move under it, the bar will engage the upper sides of these supports and the extent of this frictional engagement is regulated in the manner described by the springs 36. In order to return the treadle 15 to its normal position after each operation, the same is provided on one side with an arm 37 projecting rearwardly to the outer end of which is secured one end of a coil spring 38, the inner end of which is secured to the frame as indicated at 39. Extending between and supported by the front standards 1 is a cross bar 40 mounted centrally on which is a casting 41 to which is secured a bow spring 42, the end portions of which, as shown, are bent inward to frictionally engage the series of clamping supports in their travel around the machine. The upper end of this bow spring is slightly bent inward as indicated at 43, to provide a catch which engages between the separated ends of the plates 13 and 14 to maintain the clamping support engaged thereby from being pressed upwardly by the expansion of the compressed soles, thus tending to maintain pressure on the soles and also operating to prevent a retrograde movement of the carrier under influence of spring 30.

Referring to Figure 1 at the right of the view, there is shown a pasting device of a conventional or any preferred type comprising a power-driven roller 44 rotating in a trough 45 containing paste, with which cooperates a pressure roller 46 mounted in a rocking support 47 normally pressed upward by a spring 48 against an adjusting screw 49. The screw 49 may be turned to vary the distance between the two rollers, as will be understood. 50 indicates a guard over which the soles passing between the pasting rollers pass in moving toward the clamping support.

Assuming the parts to be in the position shown in Figure 2, the operator raises the hook 29 from engagement with the front clamping support, and the latter either falls by gravity or may be moved by hand to the postition shown in dotted lines where its bottom plate 14 will rest upon a pile of soles built up on preceding support. In passing to this position the bottom of the clamping support depresses the spring dog 20 and as it moves off of the same, the latter springs back into the position shown in the figure. The operator now presses the treadle 15 inward with his foot, which causes the dog 20 to engage the front edge of the back plate 12 thereby turning the carrier 6 and forcing the clamping support to the position where the catch 43 will snap between its plates, as shown at the left of Figure 2. This brings another clamping member into engagement with the hook 29 and due to the construction described, the spring 28 may yield under the impact against the resistance of spring 30, preventing a sudden jar and reducing the noise and vibration which would otherwise occur. The spring 32 bears down upon the clamping members with sufficient force to retard the free movement of the carrier 6 so that the impact of hook 29 is quite slight. The operator then proceeds to remove sheets of material to be pasted together from the receptacles 25, 26, a sheet, such as a layer of a sole, being first taken from the receptacle 25 and placed on the support and then a second layer from the receptacle 26 which is passed between the pasting rollers 44, 46 and as it emerges therefrom over the support, is placed by the operator in position on the first sheet or layer, and this is continued until a pile of laminated soles of the desired height is built up on the support, when the operator again raises the hook 29, moves the clamping member engaged thereby on to the top of the newly built up pile of soles, removes the completed soles from the last mentioned clamping member and again operates the treadle to bring the parts to the position shown in said Figure 2. It will be understood that the clamping member shown in dotted lines in Figure 2 is supposed to indicate the clamping member shown in full lines, engaged by the hook 29 after the latter clamping member has been released and moved to the position shown in dotted lines and the soles removed therefrom and before the actuation of the treadle 15. In each movement of the carrier 6 effected by the operation of the treadle, the springs 32 and 42 normally frictionally engaging certain of the clamping supports, will produce sufficient resistance to the movement to cause a certain amount of pressure to be exerted upon the assembled soles as the carrier is moved by pressure against one of the clamping supports 8 mounted thereon, and such pressure is, of course, transmitted throughout the entire series of built up soles on the carrier.

It will readily be seen and appreciated by those skilled in the art, that the machine described provides for the ready assemblage of the laminations of the sole, that it is convenient of access, and that having no power-driven parts, so far as the machine proper is concerned, its movement is controlled entirely by the operator; the pressure required and the movement of the carrier is effected by simple foot movement exerted on the treadle, and owing to the great leverage afforded by the latter, the power required to be exerted is very slight. Thus the speed of operation is controlled by the operator, and the latter does not have to time his operations to agree with the movement of any automatically operated parts, nor does he have to concern himself with the control of driving mechanism for operating the machine.

I claim:

1. In a machine of the class described, in combination with a traveling endless carrier, a series of clamping supports slidably mounted on and movable entirely around the carrier and adapted to have laminated products built up thereon, means for moving the carrier a given distance, and means for arresting the movement of the carrier at a given point.

2. In a machine of the class described, in combination with a circular carrier, a series of clamping supports slidably mounted on the periphery thereof and adapted to have laminated products built up thereon, each support being movable in turn into a position on top of a pile of the laminated products built up on a preceding support, means for moving the carrier a given distance, and means for arresting the movement of the carrier at a given point.

3. In a machine of the class described, a traveling endless carrier movable toward the front of the machine with regard to the position of the operator, a series of clamping supports slidably mounted on and movable entirely around the carrier and adapted to have laminated products built up thereon, means for moving the carrier a given distance, and means for arresting the movement of the carrier at a given point.

4. In a machine of the class described, in combination with a traveling carrier, a series of clamping supports slidably mounted on the carrier and adapted to have laminated products built up thereon, each support being movable in turn into a position on top of a pile of the laminated products built up on a preceding support, manually operated means for moving the carrier a given distance, and means for arresting the movement of the carrier at a given point.

5. In a machine of the class described, in combination with a rotatable carrier, a series of clamping supports slidably mounted on the carrier and adapted to have laminated products built up thereon, each support being movable in turn into a position on top of a pile of laminated products built up on a preceding support, manually operated means for moving the carrier a given distance including a member adapted to engage one of the clamping supports, and means for arresting the movement of the carrier at a given point.

6. In a machine of the class described, in combination with a rotatable carrier, a series of clamping supports slidably mounted on the carrier and adapted to have laminated products built up thereon, each support being movable in turn into a position on top of a pile of the laminated products built up on a preceding support, means for moving the carrier a given distance, including a member adapted to engage one of the clamping supports, means for frictionally engaging the clamping members to retard the movement thereof, and means for arresting the movement of the carrier at a given point.

7. In a machine of the class described, a traveling carrier comprising parallel circular members having opposed peripheral grooves, clamping supports provided on their under side with oppositely directed tongues engaging in said grooves, a series of said clamping supports occupying a portion only of the periphery of said carrier, each of said supports being adapted to have a pile of laminated products built up thereon, and each support being movable in turn to a position on top of the pile of products built up on a preceding support, manually operated means for turning said carrier a given distance, including a member adapted to engage one of said supports, and releasable means for arresting the movement of the carrier at a given point.

8. In a machine of the class described, a traveling carrier comprising parallel circular members having opposed peripheral grooves, clamping supports provided on their under side with oppositely directed tongues engaging in said grooves, a series of said clamping supports occupying a portion only of the periphery of said carrier, each of said supports being adapted to have a pile of laminated products built up thereon, and each support being movable in turn to a position on top of the pile of products built up on a preceding support, manually operated means for turning said carrier a given distance, including a member adapted to engage one of said supports, and releasable means for engaging the forward one of the circular series of supports to arrest the movement of the carrier at a given point.

9. In a machine of the class described, in combination with a circular carrier, a series of clamping supports slidably mounted on the periphery thereof and adapted to have laminated products built up thereon, each support being movable in turn into a position on top of a pile of the laminated products built up on a preceding support, means for moving the carrier a given distance, and releasable means for engaging the forward one of the circular series of supports to arrest the movement of the carrier at a given point.

10. In a machine of the class described, in combination with a circular carrier, a series of clamping supports slidably mounted on the periphery thereof and adapted to have laminated products built up thereon, each support being movable in turn into a position on top of a pile of the laminated products built up on a preceding support, manually-operated means for engaging one of said supports for moving the carrier a given distance, and releasable means for engaging the forward one of the series of supports to arrest the movement of the carrier at a given point.

11. In a machine of the class described, in combination with a rotatable carrier, a series of clamping supports slidably mounted on the periphery therof and adapted to have laminated products built up thereon, each support being movable in turn into a position on top of a pile of the laminated products built up on a preceding support, means for moving the carrier a given distance, and releasable means for arresting the movement of the carrier at a given point, comprising a longitudinally movable spring member having a stop for engaging the forward one of the series of clamping members, and a spring for resisting the movement of said spring member under the impact of a support therewith.

12. In a machine of the class described, in combination with a traveling carrier, a series of clamping supports slidably mounted on the periphery thereof and adapted to have laminated products built up thereon, each support being movable in turn into a position on top of a pile of the laminated products built up on a preceding support, means for moving the carrier a given distance, yieldable means adapted to engage the forward one of the series of supports to arrest the movement of the carrier, and means for preventing a retrograde movement of the carrier.

13. In a machine of the class described, in combination with a rotatable carrier, a series of clamping supports slidably mounted on the periphery thereof and adapted to have laminated products built up thereon, each support being movable in turn into a position on top of a pile of the laminated products built up on a preceding support, manually-operated means for moving the carrier a given distance, comprising a spring-controlled dog projecting into the path of the clamping supports and adapted to engage one of the latter for effecting the movement of the carrier, and means for arresting the movement of the carrier at a given point.

14. In a machine of the class described, in combination with a rotatable endless carrier movable toward the front of the machine as respects the position of the operator, a series of clamping supports slidably mounted on and movable entirely around the carrier and adapted to have laminated products built up thereon, means for moving the carrier a given distance, means for arresting the movement of the carrier at a given point, receptacles for the products to be pasted mounted on the machine within reach of the operator, and a pasting device located adjacent to one of said receptacles and adapted to deliver the pasted article over one of said supports.

In testimony whereof, I have hereunto set my hand.

DENNIS PARKS.